United States Patent [19]

Enghofer

[11] Patent Number: 4,479,703
[45] Date of Patent: Oct. 30, 1984

[54] FRAME FOR MULTI-PURPOSE EYEGLASSES

[75] Inventor: Klaus Enghofer, Birkenfeld, Fed. Rep. of Germany

[73] Assignee: Karl Enghofer Metallwarenfabrik GmbH, Birkenfeld, Fed. Rep. of Germany

[21] Appl. No.: 329,239

[22] Filed: Dec. 10, 1981

[30] Foreign Application Priority Data

Feb. 21, 1981 [DE] Fed. Rep. of Germany ....... 3106562
Sep. 17, 1981 [DE] Fed. Rep. of Germany ....... 3137000

[51] Int. Cl.³ .................. G02C 5/14; G02C 5/18; G02C 5/20; G02C 3/00
[52] U.S. Cl. .................................. 351/123; 351/156; 351/118; 351/117
[58] Field of Search ............... 351/123, 156, 157, 118, 351/158, 117; 2/448, 449, 450

[56] References Cited

U.S. PATENT DOCUMENTS 1,819,738 8/1931 Daniels ........................ 351/156
2,494,750 1/1950 Fornicolia .................... 351/156
2,798,409 7/1957 Speers ......................... 351/157

FOREIGN PATENT DOCUMENTS 2241225 3/1975 France ......................... 351/123

Primary Examiner—Rodney B. Bovernick
Attorney, Agent, or Firm—Balogh, Osann, Kramer, Dvorak, Genova & Traub

[57] ABSTRACT

The eyeglass frame comprises a rim and two bows, each of which has a forward end hinged to the rim and a rear end. Each of said bows is provided with a fastener element, which is connected to said bow and disposed at the rear end thereof and extensible from said rear end and adapted to be releasably connected to the other of said fastener elements.

8 Claims, 12 Drawing Figures

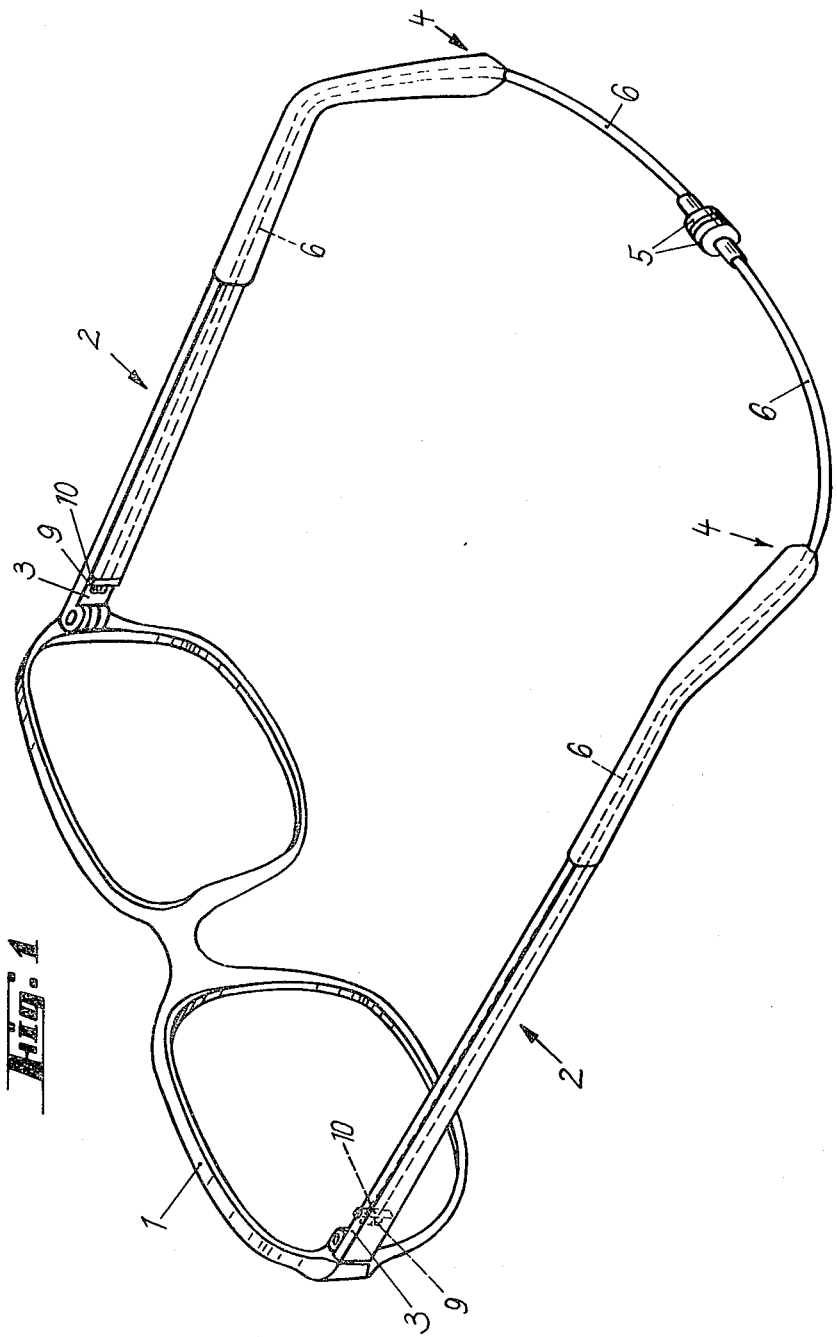

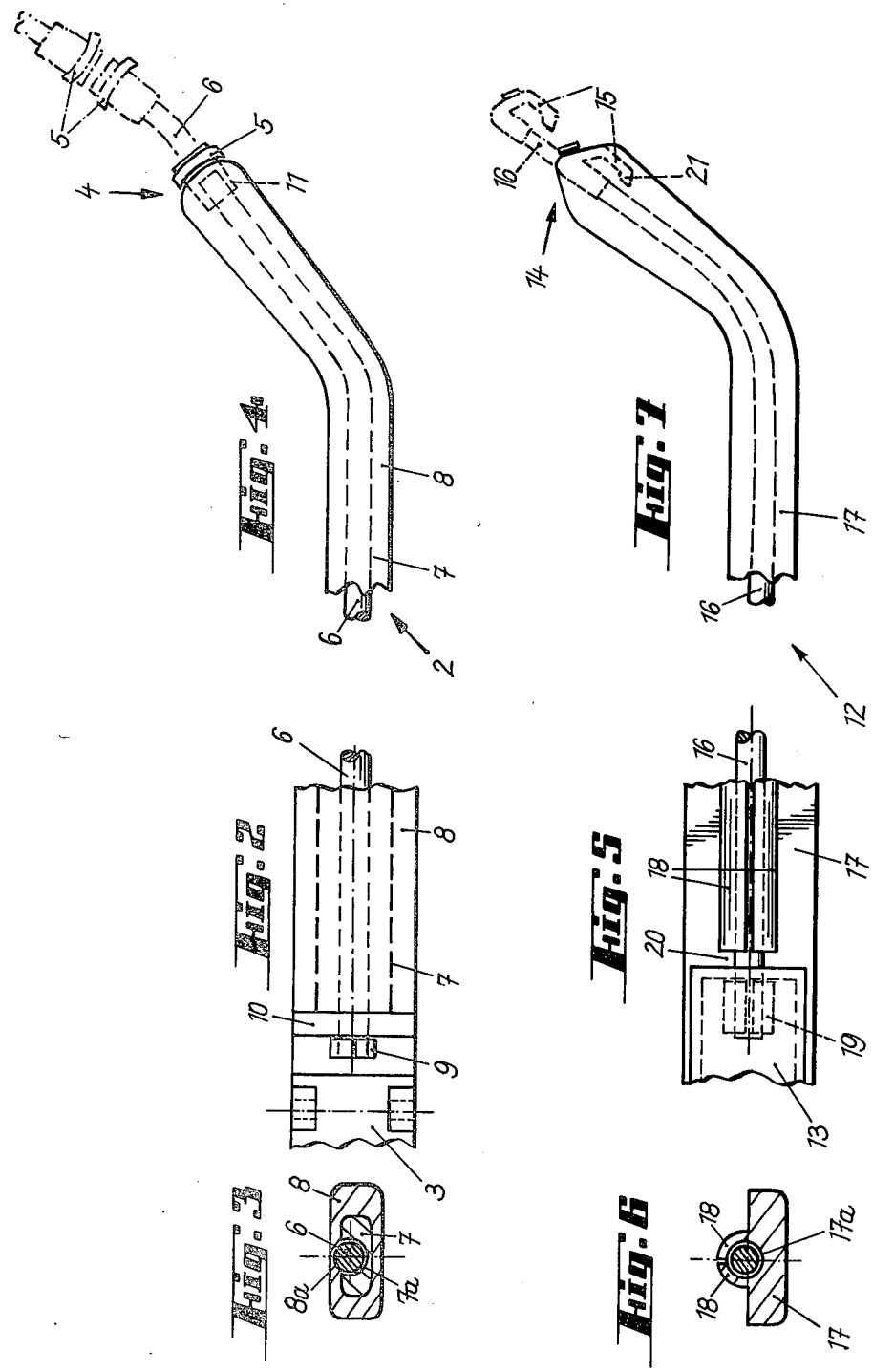

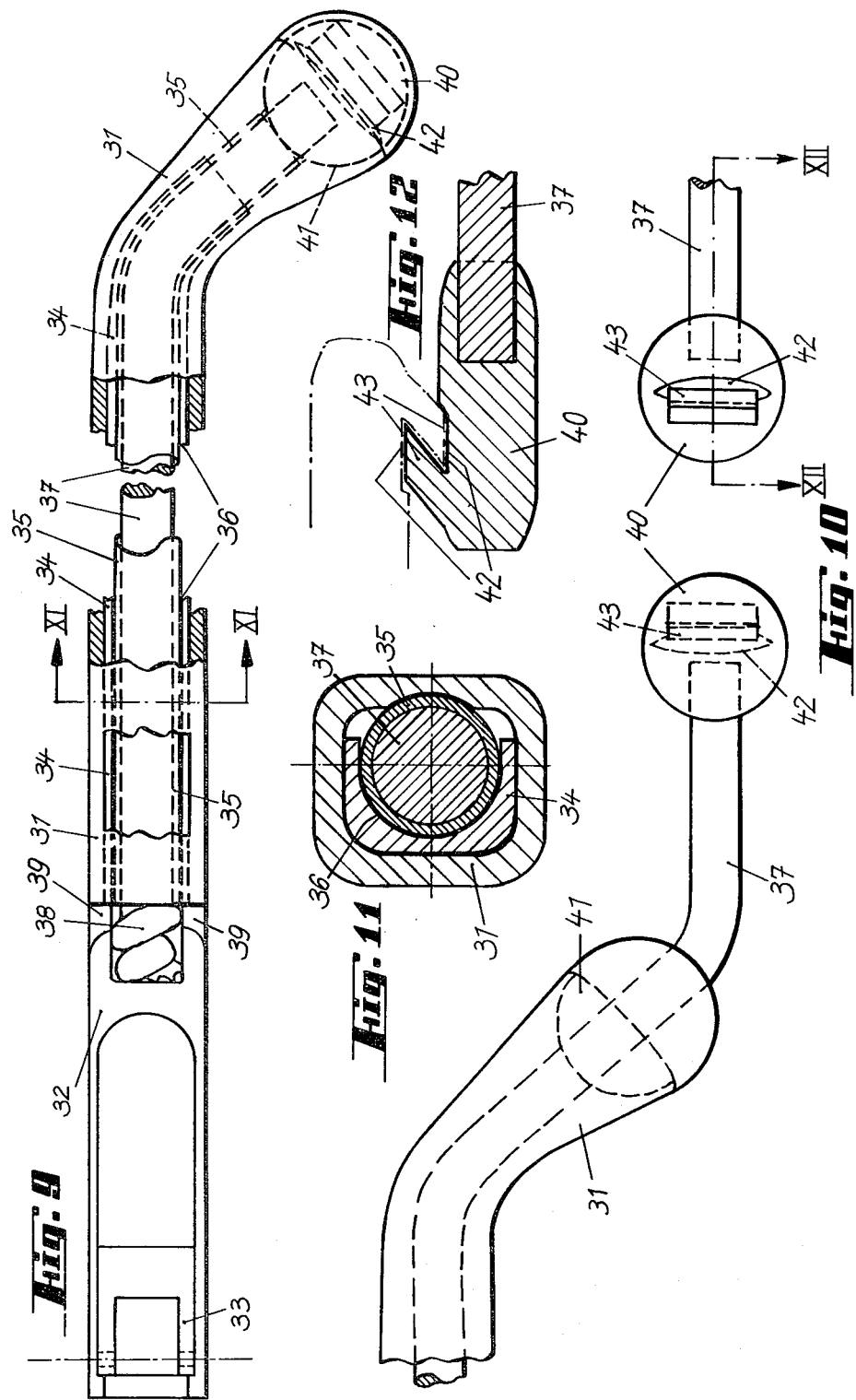

FRAME FOR MULTI-PURPOSE EYEGLASSES

This invention relates to a frame for multipurpose eyeglasses having bows hinged to the rim.

Such eyeglasses are known in various forms for everyday use or as comfort or sports eyeglasses. The latter comprises rubber bands which can be joined at the back of the head so that the eyeglasses will not fall down during sports activities or jogging. For this reason, eyeglasses for everyday use and comfort eyeglasses which extend behind the ears only with the bows are not suitable for training and sports.

It is an object of the invention to provide a frame for multi-purpose eyeglasses in which the elastic retaining means are concealed so that the eyeglasses are suitable for everyday use and for social events as well as for sports activities and jogging.

In accordance with the invention, a frame for multipurpose eyeglasses having bows hinged to the rim are provided with an extensible fastener element at the free end of at least one bow and preferably at the rear end of each bow. When the eyeglasses are worn during sports activities these fastener elements serve to hold the eyeglasses at the back of the head. For this purpose the bows are hollow and accommodate rubber cords provided with fasteners elements at their rear end. Such eyeglasses can be worn for normal purposes with the rubber cords concealed or as sports eyeglasses, when the rubber cords have been pulled out and joined together.

In accordance with another concept of the invention the bows may be made of plastic material and each bow may accommodate a flexible tube, particularly a flexible metal tube, for accommodating one of the rubber cords; said flexible tube may extend from the hinged end of the bow to the rear end thereof and may be open at said rear end so that the fastener elements connected to the extensible rubber cords can be pulled out. Such bow can be made in a simple manner in that the plastic material is molded around the metal tube, and the eyeglass frame can easily be adapted to the wearer by the optician.

Further details will then be apparent from the two following description of illustrative embodiments shown on the drawings, in which FIG. 1 is a perspective view showing the first embodiment, FIGS. 2 to 4 are enlarged fragmentary views showing parts of the embodiment of FIG. 1, the hinge for the bow being shown in cross-section, and FIGS. 5 to 7 are enlarged fragmentary views showing in cross-section the hinge of a bow of a second embodiment and the rear end portion of said bow;

FIGS. 9 and 10 are internal views showing a bow of a fourth embodiment at its hinged end portion and an end view, showing the rear end portion of said bow with the fastener element, and FIG. 11 is an enlarged sectional view taken on line XI—XI of FIG. 9 and showing the plastic bow and FIG. 12 is an enlarged sectional view taken on line XII—XII of FIG. 10.

Figure 8:
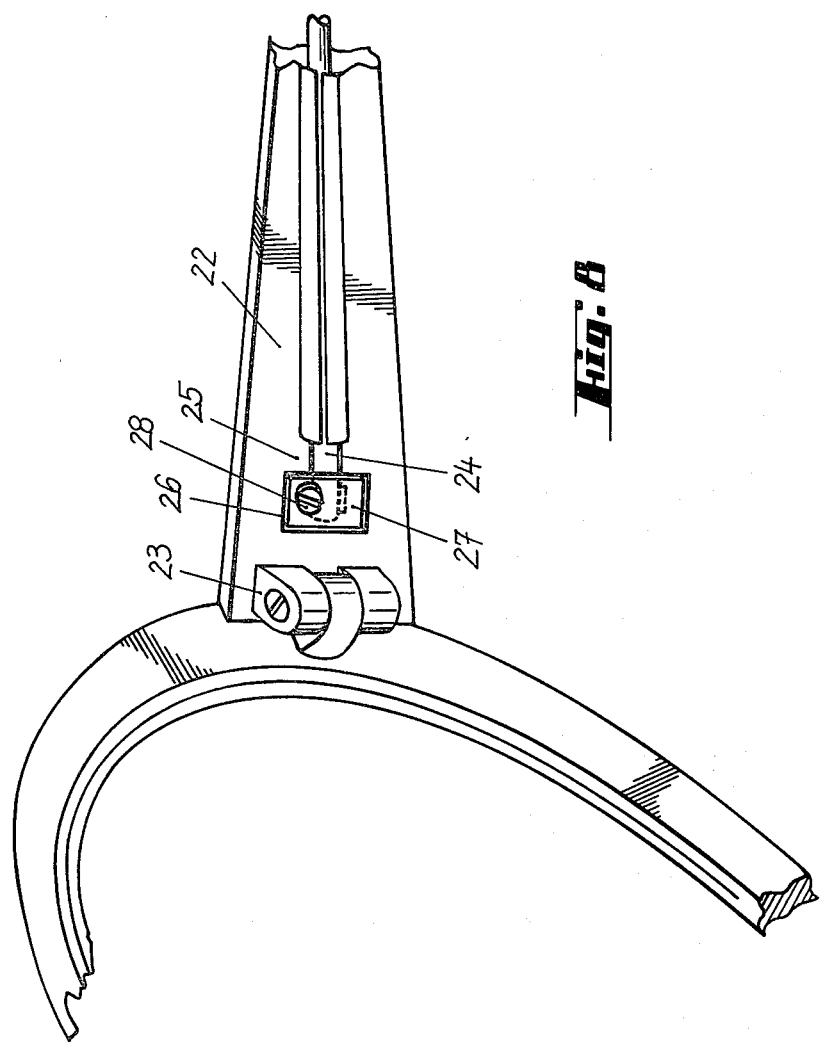
FIG. 8 is a perspective view showing part of a third embodiment.

In the first embodiment, shown in FIGS. 1 to 4, the bows 2 are connected to the rim 1 in the usual manner by hinges 3. Each bow 2 contains an extensible rubber cord 6, which is provided with a fastener element 5 consisting, e.g., of a screw-threaded or magnetic fastener element and disposed at the rear end 4 of the bow. Such multi-purpose eyeglasses may be worn for everyday use or as comfort eyeglasses but also as sports eyeglasses when the rubber cords have been joined at the back of the head, as is shown in FIG. 1.

The bows are hollow so that they can accommodate the rubber cords 6. Each bow 2 comprises core 7, which is formed with a groove 7a, and a sheath 8, which extends throughout the length of the bow and has a groove 8a. These two grooves 7a and 8a together form a cavity, which accommodates the rubber cord 6, as is apparent from the sectional view of FIG. 3. The cavity of the bow 2 is open at 10 at the forward end of the bow 2. A sleeve 9 is clamped on the rubber cord 6 at its forward end and is held at the open forward end 10 of the cavity of the bow. The rear end portion 4 of the bow has a recess 11, which is adapted to accommodate the fastener element 5 when it is not used; this is shown in FIG. 4.

The second embodiment shown in FIGS. 5 to 7 comprises a bow 12, which is provided with a hinge 13, which consists of a relatively long spring hinge. The bow 12 is provided at its rear end 14 with a fastener element 15, which consists of a hook and is secured to the rear end of an extensible rubber cord 16. Such multipurpose eyeglasses can also be worn in everyday use and as comfort eyeglasses or as sports eyeglasses when the rubber cords have been joined at the back of the head.

The bows 12 are hollow so that they can accommodate the rubber cords 16. The bow 12 comprises a metallic body 17, which is formed with an internal groove 17a and two ribs 18 on opposite sides of said groove. These ribs can be bent toward each other so that they define together with the groove 17a a cavity for accommodating the rubber cord 16. This is shown in section in FIG. 6. In that embodiment a sleeve 19 has also been clamped on the forward end portion of the rubber cord 16 and is retained at the open forward end 20 of the cavity and concealed under the spring hinge 13. When the fastening hook 15 is not used, it is concealed in a recess 21 formed in the rear end portion 14 of the bow, as is apparent from FIG. 7.

In the embodiment shown in perspective in FIG. 8, a bow 22 is provided with a hinge 23 and is hollow to accommodate the rubber cord 24. Just as in the foregoing embodiment, the bow 22 consists of metal. The rubber cord 24 is clamped in this embodiment by means of a pressure plate 27 and a clamp screw 28 in a recess 26 formed in the bow in front of the open forward end of the cavity so that the rubber cord 24 can be shortened or replaced after it has been installed.

A fourth embodiment is shown in FIGS. 9 to 12. In that case the bow comprises a plastic member and a metallic forward end portion 32, which is hinged by a hinge 33 to the rim. The metallic end portion 32 accommodates a core 34. The metallic end portion 32 and the core 34 are formed with a groove 36, which accommodates a flexible metal tube. A rubber cord 37 extends through the metal tube 35 and is fixed to the metallic end portion 32 in that knot 38 of the cord 37 is held between the side lugs 39. At the rear end of the bow, the rubber cord 37 is embedded in a molded plastic plate 40, which is partly received by an end pocket 41 and has a transverse groove 42 formed with barbs 43 so that the plates 40 can be hooked into each other at the back of the head of the wearer and the eyeglasses will then be held safely on the head even during sports activities and the like. In this embodiment both fastening hooks consisting of plastic plates 40 with a transverse groove 42 and a barb 43 are identical so that they can be made in the same injection mold.

What is claimed is:

1. Eyeglasses having a pair of hollow temple bows, each temple bow having a free end and a hinged end, a retaining means disposed in each temple bow and adapted to be withdrawn from said free end of a respective bow, and characterized by the combination of the following features:
   (a) each of said retaining means comprising an elastic cord having one end solidly attached to said hinged end of a respective bow,
   (b) each of said elastic cords being disposed in a hollow portion of a respective bow, and
   (c) fastening means connected to the ends of said elastic cords adapted to connect said ends of said cords behind the head of a wearer when in an extended state, each fastening means disposed in a recess at the free end of a respective bow when the respective elastic cord is in a non-extended state.

2. Eyeglasses according to claim 1, comprising a flexible metal tube in each of said bows for containing said cord.

3. Eyeglasses according to claim 1, comprising pressure plates disposed in each bow for securing each respective cord.

4. Eyeglasses according to claim 1, comprising cord-retaining means disposed at the hinged ends of each of said bows, and knots being disposed on the ends of said cords, said cords being secured by said cord-retaining means.

5. Eyeglasses according to claim 1 wherein said fastening means comprises a hook lock means which serves as a releasable connection of the ends of said elastic cords.

6. Eyeglasses according to claim 1, wherein said fastening means comprises magnetic lock means which serves as a releasable connection of said elastic cords.

7. Eyeglasses according to claim 1, wherein said fastening means comprises locking pieces with barb-like transverse grooves for releasable interconnection.

8. Eyeglasses having bows adapted to serve as retention pieces and extractable attachment members which are extendable out and in of free ends of said bows, characterized by:
   (a) said attachment members being in the form of elastic cords secured at their inner ends to inner ends of respective bows,
   (b) each of said bows comprising an inner groove for containing a respective elastic cord,
   (c) each of said bows comprising a pocket at its free end, and
   (d) a fastener element connected to an outer end of each of said cords and being adapted to interconnect with another fastener element behind the head of the wearer when said cords are in the extended condition and being adapted to lie in a respective bow pocket when said cords are in the retracted position.

* * * * *